United States Patent [19]

Massengeil

[11] 4,090,788

[45] May 23, 1978

[54] OPTICAL COPYING MACHINE

[75] Inventor: Hans A. Massengeil, Munich, Germany

[73] Assignee: Agfa-Gevaert Aktiengesellschaft, Leverkusen, Germany

[21] Appl. No.: 740,370

[22] Filed: Nov. 10, 1976

[30] Foreign Application Priority Data

Nov. 28, 1975 Germany .............................. 2553666

[51] Int. Cl.² .......................................... G03B 27/76
[52] U.S. Cl. ........................................ 355/71; 355/8; 355/51
[58] Field of Search ..................... 355/3 R, 67, 71, 50, 355/51, 8, 69

[56] References Cited

U.S. PATENT DOCUMENTS

| 3,961,847 | 6/1976 | Turner et al. | 355/67 X |
| 3,977,777 | 8/1976 | Tanaka et al. | 355/69 X |
| 3,998,539 | 12/1976 | Kidd | 355/69 X |

Primary Examiner—Richard A. Wintercorn
Attorney, Agent, or Firm—Peter K. Kontler

[57] ABSTRACT

A copying machine wherein successive strip-shaped portions of an original are imaged onto a moving photosensitive carrier by a system which is mounted in part on a reciprocable carriage and includes one or more fluorescent or incandescent lamps and a mask having an elongated aperture through which light passes toward and is reflected on successive portions of the original when the carriage is in motion. The width of each strip-shaped portion is a whole multiple of the quotient of the speed of the carriage and the modulation frequency of light. The modulation frequency is twice the frequency of alternating current which is supplied to the lamp or lamps. Such selection of the width of illuminated portions of the original prevents the formation of lighter and darker transverse streaks between the marginal portions of the reproduction. The width of the aperture preferably increases stepwise from the center toward both ends to compensate for customary reduction of the brightness of lamp or lamps in the same direction. The width of each section of such aperture is also a whole multiple of the aforementioned quotient.

10 Claims, 4 Drawing Figures

OPTICAL COPYING MACHINE

CROSS-REFERENCE TO RELATED APPLICATION

The copying machine of the present invention is related to the machine which is disclosed in the commonly owned copending application Ser. No. 742,887 filed Nov. 18, 1976 and entitled "Copying Machine."

BACKGROUND OF THE INVENTION

The present invention relates to optical copying machines in general, and more particularly to improvements in copying machines wherein the imaging system moves relative to the support for an original, or vice versa, and includes means for exposing successive strip-shaped portions of the original to modulated light in order to image such portions onto a moving photosensitive carrier, e.g., a web of photographic paper. The exposing means of the imaging system includes a mask or diaphragm which shields the remainder of the original from copying light.

When the imaging system of a copying machine includes one or more light sources (e.g., fluorescent lamps) which are in circuit with a source of alternating current, the intensity of copying light varies at a certain frequency whereby the reproduced image and its background often exhibit alternating rib- or strip-shaped regions or streaks of more and less pronounced density which extend at right angles to the direction of movement and all the way between the marginal portions of the carrier. Such undesirable formations are invariably attributable to fluctuations in the intensity of modulated copying light; they are especially pronounced if the number of light modulations during travel of a given portion of the original with respect to the imaging system or vice versa is relatively small. The just described situation will arise when the intensity of copying light is high, when the sensitivity of the carrier is high, when the carrier is a relatively narrow web and/or when the speed of the original with respect to the imaging system or vice versa is high.

It has been found that the development of streaks is attributable to rather pronounced differences between total amounts of light which impinge upon successive portions of the original during movment of the original relative to the imaging system or vice versa. In other words, and depending on the phase of the imaging system at the start of exposure of a given portion of the original to copying light, the timing of starting and final impulses of the imaging system is not identical for different portions or strips of the original.

SUMMARY OF THE INVENTION

An object of the invention is to provide a novel and improved copying machine wherein the reproduction of an original is not likely to exhibit pronounced and relatively long streaks of different density in spite of the fact that the intensity of modulated copying light varies during exposure of an original.

Another object of the invention is to provide a novel and improved mask or diaphragm for use in the above outlined copying machine.

A further object of the invention is to provide a novel and improved copying machine of the type wherein the original moves relative to the imaging system or vice versa to effect the exposure of successive narrow strip-shaped portions of the original to copying light.

An additional object of the invention is to provide the copying machine with novel and improved means which compensates for the fact that the intensity of copying light which issues from one or more elongated light sources varies in the longitudinal direction of such sources.

The invention is embodied in an optical copying machine wherein an original is imaged onto a moving photosensitive carrier. The machine comprises an imaging system including at least one source of modulated light (i.e., at least one fluorescent or incandescent lamp which is in circuit with a source of alternating current) and a diaphragm or mask having an elongated aperture through which light issuing from the source passes to impinge upon the original, and means for effecting a relative movement between the original and the imaging system so that light which passes through the aperture of the mask impinges upon successive strip-shaped portions of the original (this can be achieved by moving the mask and the light source relative to a copyboard for the original or vice versa). In accordance with a feature of the invention, the width of each strip-shaped portion of the original is a whole multiple of the quotient of the speed of relative movement between the original and the imaging system and the modulation frequency of light issuing from the light source. The modulation frequency is $2f$ wherein $f$ is the frequency of alternating current which is supplied to the lamp or lamps of the imaging system. Such selection of the width of strip-shaped portions of the original insures that each portion of the original is exposed to identical amounts of light independently of the phase of pulsating light. This, in turn, insures that the reproduction of the original on the carrier is free of streaks.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
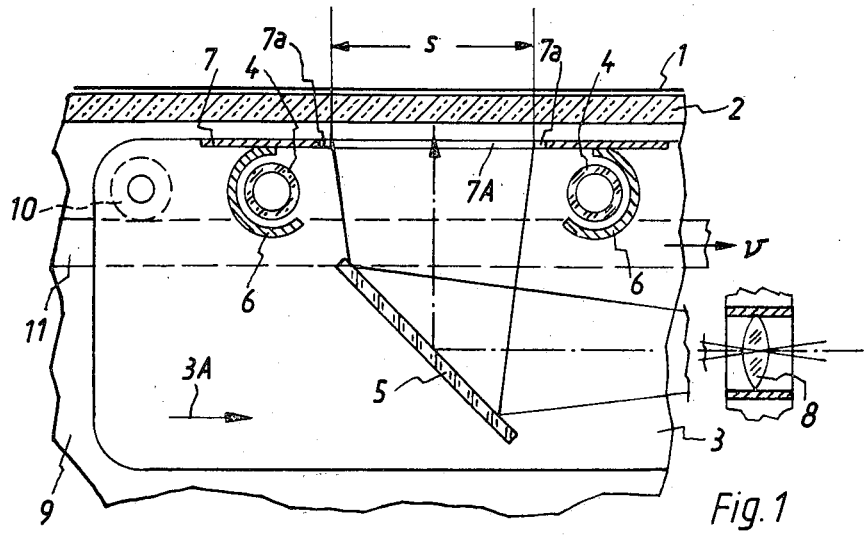
FIG. 1 is a fragmentary longitudinal sectional view of a copying machine which embodies the invention.

FIG. 1 illustrates a portion of a copying machine for imaging successive portions or strips of an original onto a moving photosensitive carrier, not shown. The original 1 rests on a stationary light-transmitting support or copyboard 2. The copyboard 2 is mounted in or on a housing frame 9 which includes one or more rails 11 for the wheels 10 of a reciprocable carriage 3 constituting a mobile holder for certain elements of the optical imaging system. The imaging system includes a lens 8 which is installed in the frame 9, an opaque diaphragm or mask 7 which is movable with the carriage 3 and defines an elongated slit-shaped aperture 7A extending transversely of the direction of movement (arrow 3A) of the carriage 3, a suitably inclined mirror 5 which is movable with the carriage 3 and reflects light toward the lens 8, two light sources 4, and two associated reflectors 6 which are rigid with and adjacent to the mask 7 at the opposite sides of the aperture 7A. The carrier may constitute a web of photographic paper one side of which is coated with a suitable emulsion and which is paid out by a supply reel and collected by a takeup reel in a manner well known from the art of copying machines. During imaging of successive strip-shaped portions of the original 1 onto the carrier, the carriage 3 travels at a speed $v$. The light sources 4 are assumed to constitute tubular fluorescent lamps which are parallel to the central symmetry plane of the aperture 7A, i.e., normal to the direction of movement of the carriage 3 and carrier. The aperture 7A is flanked by the edge portions 7a of the mask 7, and such edge portions extend in substantial or exact parallelism with the axes of the lamps 4.

It is clear that the elements 4–7 of the imaging system can be fixedly mounted in the frame 9 if the copyboard 2 for the original 1 is movable relative to the mask 7 and lens 8. Furthermore, the fluorescent lamps 4 can be replaced with incandescent lamps or other suitable light sources without departing from the spirit of the invention. However, the mask 7 can be installed close to the plane of the carrier rather than in close proximity to the plane of the original 1 (as shown in FIG. 1).

Optical copying machines (including, among others, photocopiers, electrostatic copiers and microfilm copiers) normally (and almost invariably) utilize lamps which are in circuit with a source of alternating current. In such copying machines, the intensity of light varies at twice the frequency ($f$) of alternating current (as a rule, $f$ equals 50–60 cycles per second). Thus, the modulation frequency of light (which is produced by each half wave above as well as by each half wave below the time axis) equals $2f$.

Figure 2:
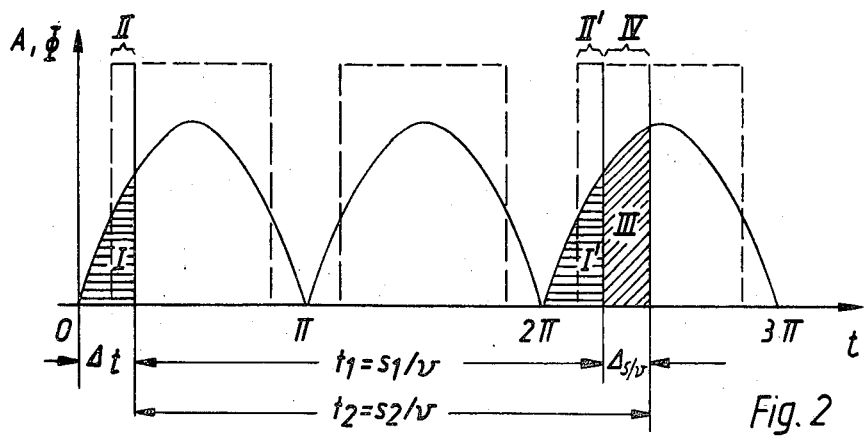
FIG. 2 is a diagram showing the relationship between the speed of the original relative to the imaging system (or vice versa) and the illumination of successive portions of the original.

FIG. 2 shows the relationship between the amplitude A of alternating current and the intensity $\Phi$ (phi) of light as a function of time $t$. It is assumed that the intensity $\Phi$ is exactly or nearly proportional to the amplitude A; this normally applies for customary incandescent lamps. If the mask 7 is moved along the original 1 at a speed $v$, each unit area of the original is exposed to light for an interval $$t_D = s/v. \qquad (I)$$

The duration $t_H$ of a half wave of the alternating current can be expressed as follows:

$$t_H = 1/(2f) = \pi. \qquad (II)$$

FIG. 2 shows that $t_D$ is the same for each and every exposed unit area of the original (independently of the exact starting time of illumination) if the overall time (e.g., $t_1$) for illumination of each unit area is a whole multiple of $t_H$ (i.e., a whole multiple of the duration of a half wave). Thus, and assuming that $t_1 = s_1/v$, the exposure of a unit area of the original 1 to light which passes through the aperture 7A and is thereupon reflected by the mirror 5 need not begin at $t = 0$, as long as $t_1$ is a whole multiple of $t_H$. The illustrated interval $t_1$ begins with a delay $\Delta t$ after $t = 0$ so that it embraces a portion of the first half wave of FIG. 2, the entire second wave, and a portion I' of the third half wave. The portion I' equals I which latter is the non-embraced portion of the first half wave. It is immaterial whether the portion I constitutes a minor or a major portion or fraction of the first half wave, as long as I equals I'. In other words, $t_D$ must equal $n$ times $t_H$ wherein $n$ is a whole number. The width $s$ of each unit area of the original 1 can be calculated by dividing $t_D$ with $t_H$, i.e.:

$$s = n \cdot v/(2f). \qquad (III)$$

If $t_D = t_2 = s_2/v$, wherein $t_2 = t_1 + \Delta s/v$ (see FIG. 2), i.e., wherein $t_2$ is not a whole multiple of $t_H$, the illumination of a unit area of the original 1 is not uniform because the embraced portion (I' + III) of the third half wave exceeds the non-embraced portion (I) of the first half wave. This can happen if $t$ is too long and/or if the width $s$ of the unit area of the original 1 does not satisfy the equation (III) above. It will be readily seen that the value of III in FIG. 2 depends to a large extent on the value of $\Delta t$. The maximum value of III is reached if it is halved by an ordinate which divides a half wave, i.e., if the two halves of III are mirror symmetrical to a phase $n \cdot \pi/2$. The minimum value of the area III is reached when the two halves of this area are mirror symmetrical to a phase $n \cdot \pi$. Otherwise stated, the maximum and minimum areas of III are spaced from each other by $t = 1/4f$, as considered in the direction of the time axis, which equals the distance ($v \cdot t$) covered by the light passing through aperture 7A and along the original 1 during such interval of time. It can be said that the portion ($s_V$) of $s$ which corresponds to a quarter wave is:

$$s_V = v/(4f). \qquad (IV)$$

Analogous relationships will develop if the variation of light intensity $\Phi$ deviates from the amplitude A of alternating current. This is shown in FIG. 2 by broken lines. The aforediscussed sinusoidal curve (shown by solid lines) represents variations of the intensity of light which is supplied by one or more incandescent lamps. The broken-line curve represents variations of intensity of light which is furnished by a different light source, e.g., one or more fluorescent lamps. The intensity $\Phi$ rises abruptly from zero to a maximum value and abruptly decreases to zero at a locus close to the frequency $2f$. The intensity rises from zero to a maximum value when the current or voltage reaches a predetermined threshold value and vice versa. Actually, the intensity of light which is furnished by one or more fluorescent lamps does not always vary in exact accordance with the broken-line curve of FIG. 2; the sections or half waves of the curve are normally trapezoids or triangles. However, the basic requirement for uniform illumination of successive unit areas of the original 1 remains the same, i.e., the area II must equal the area II'. In other words, if the illumination begins at $\Delta t$, it must end at $t_1 = s_1/v$. Here too, $t = s/v$ must equal $n$ times $t_H$ wherein $t_H$ is the duration of a half wave and $n$ is a whole number. If the illumination of a selected portion of the original 1 begins at $\Delta t$ and ends at $t_2 = s_2/v$, the area of IV is not compensated for and the reproduced image as well as its background will exhibit discernible streaks extending across the entire reproduction of the original.

It will be noted that, when the variations of Φ deviate from a sinusoidal curve, the differences in illumination of successive unit areas of the original are especially pronounced (note that the area IV in FIG. 2 greatly exceeds the area III). In most instances, the deviation can amount to 5–10 percent of the total amount of light which should reach the original in order to avoid the formation of streaks on the reproduction. This suffices to produce pronounced streaks, especially if the gradation of photosensitive carrier is steep. In the case of a carrier web having an average width, and further assuming that the web is advanced at an average speed and has average sensitivity, the interval of exposure of a unit length of the original to copying light normally equals $5-10 t_H$ whereby the maximum difference in illumination of successive unit lengths equals the major part of a half wave.

Figure 4:
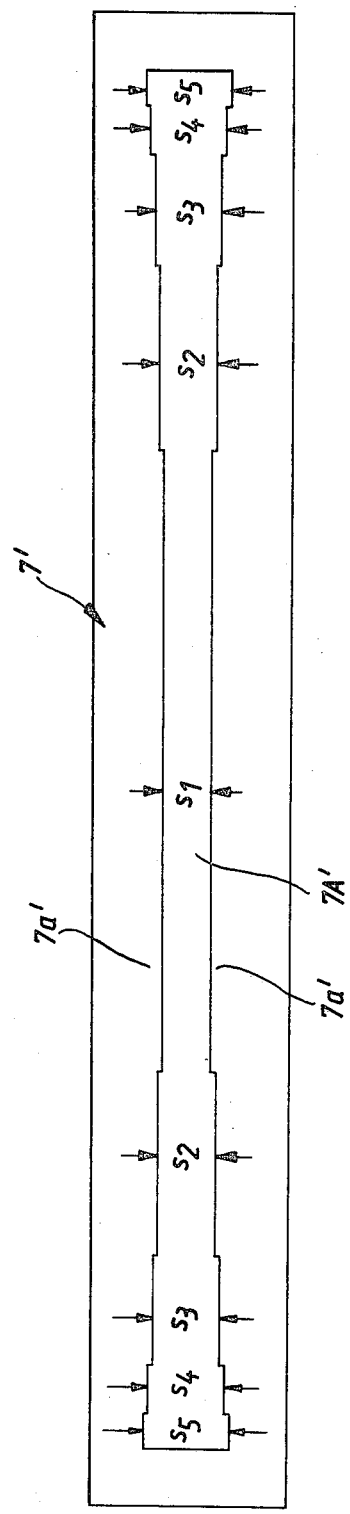
FIG. 4 is a plan view of a novel mask which can be used in the imaging system of the improved copying machine.

FIG. 4 illustrates that the width of the elongated aperture 7A' between the edge portions 7a' of a mask 7' may vary, as considered in the longitudinal direction of the aperture. If the width of the aperture varies, the minimum width ($s_1$) is located midway between the ends of the aperture, and the width changes (increases) stepwise (to $s_2$, $s_3$, $s_4$ and finally $s_5$) from the center toward both ends of the aperture. Such types of masks are preferred in many presently known imaging systems wherein the brightness of the lamp or lamps decreases from the center toward both ends. The width of the aperture 7A' increases at a rate which is calculated to compensate (at least substantially) for such decrease in brightness of the lamp or lamps. The width of various sections of the aperture 7A' is constant, and the width of each section equals a whole multiple of the ratio of relative speed between the original 1 and mirror 5 to twice the modulation frequency of the light source. In other words, $s_1 = n_1 \cdot v/(2f)$, $s_2 = n_2 \cdot v/(2f)$, etc., wherein $n_1$, $n_2$, etc. are different whole numbers.

Figure 3:
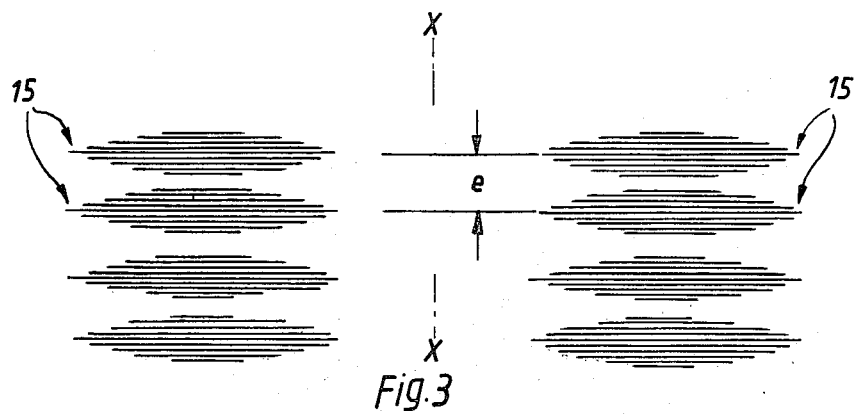
FIG. 3 illustrates the distribution of streaks of greater and lesser density on the carrier when the imaging system employs a mask with an aperture of continuously varying width.

Referring finally to FIG. 3, there is shown the distribution of ribs or streaks 15 across the width of a photosensitive carrier, e.g., a web of photographic paper. Such distribution of ribs or streaks develops when the imaging system employs a mask or diaphragm having an aperture of constantly varying width. The distance $e$ between the longest portions of ribs or streaks 15 is the same as in the case of streaks which extend across the full width of the carrier and equals $v/2f$, i.e., the distance which is covered by the carriage during the interval that elapses while the current or voltage has advanced by half a cycle. The streaks or ribs 15 of the type shown in FIG. 3 are less bothersome to the eyes of observers of the reproductions of originals than uninterrupted streaks which extend across the full width of the copy carrier. One half of each of these streaks or ribs 15 can be said to "swell" (increase in width) in a direction at right angles to and away from the respective marginal portion of the copy carrier, and the other half of each rib or streak decreases in width toward the central longitudinal symmetry plane X—X of the carrier. The streaks 15 will not develop if the width of the aperture varies stepwise in a manner as shown in FIG. 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In an optical copying machine wherein an original is imaged onto a photosensitive carrier, a combination comprising an imaging system including a source of modulated light and a mask having an elongated aperture through which light issuing from said source passes to impinge upon the original whereby such light exhibits the tendency to produce lighter and darker transverse streaks between the marginal portions of the photosensitive carrier; and means for effecting a relative movement between the original and said system so that light passing through said aperture impinges upon successive strip-shaped portions of the original, the width of said strip-shaped portions being a whole multiple of the quotient of the speed of said relative movement and the modulation frequency of light issuing from said source to counteract said tendency of modulated light to produce said streaks.

2. A combination as defined in claim 1, wherein the intensity of modulated light which issues from said source varies in directions from the center toward both ends of said elongated aperture and the width of said aperture varies in the same directions to compensate for such variations of light intensity.

3. A combination as defined in claim 2, wherein the width of said aperture increases stepwise in each of said directions so that said aperture includes a plurality of sections of different width.

4. A combination as defined in claim 3, wherein the width of each section of said aperture is a whole multiple of the quotient of said speed of relative movement and the modulation frequency of light.

5. A combination as defined in claim 1, wherein said source comprises at least one incandescent lamp.

6. A combination as defined in claim 1, wherein said source includes at least one fluorescent lamp.

7. A combination as defined in claim 1, wherein said source includes at least one lamp in circuit with a source of alternating current.

8. A combination as defined in claim 1, wherein said means for effecting said relative movement includes a mobile carriage for said source and said mask.

9. A combination as defined in claim 8, further comprising a stationary light-transmitting support for the original and a lens, said carriage being reciprocable along said support and said imaging system further comprising a mirror mounted on said carriage and arranged to reflect against said lens light which has passed through said aperture.

10. A combination as defined in claim 1, wherein the width of said strip-shaped portions is $n$ times said quotient and $n$ exceeds one.

* * * * *